(12) United States Patent
Oshima et al.

(10) Patent No.: US 7,490,693 B2
(45) Date of Patent: Feb. 17, 2009

(54) GRAB RAIL AND MUFFLER SUPPORT STRUCTURE

(75) Inventors: Tadashi Oshima, Saitama (JP); Hiromitsu Shiina, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 533 days.

(21) Appl. No.: 11/225,206

(22) Filed: Sep. 14, 2005

(65) Prior Publication Data

US 2006/0076176 A1    Apr. 13, 2006

(30) Foreign Application Priority Data

Sep. 29, 2004    (JP)    ............................. 2004-283490

(51) Int. Cl.
    *B60K 13/04*    (2006.01)
(52) U.S. Cl. .................... 180/309; 180/225; 296/37.15
(58) Field of Classification Search ................ 180/309, 180/219, 225; 296/37.15; D12/110, 114, D12/117

See application file for complete search history.

(56) References Cited

U.S. PATENT DOCUMENTS

| 6,659,547 | B2 * | 12/2003 | Petersen | ................... 297/215.1 |
| 6,695,330 | B2 * | 2/2004 | Hata | ........................ 280/152.3 |
| D492,222 | S * | 6/2004 | Uchiyama | ................... D12/110 |
| D500,463 | S * | 1/2005 | Heinrich et al. | ............. D12/110 |
| 6,860,359 | B2 * | 3/2005 | Tanabe et al. | ................ 180/309 |

FOREIGN PATENT DOCUMENTS

| JP | 01101280 A | * | 4/1989 |
| JP | 6-2876 Y2 | | 1/1994 |
| JP | 10-236358 A | | 9/1998 |

* cited by examiner

*Primary Examiner*—Christopher P Ellis
*Assistant Examiner*—John D Walters
(74) *Attorney, Agent, or Firm*—Birch, Stewart, Kolasch & Birch, LLP (57) ABSTRACT

A grab rail and a muffler support structure has a reduced number of components and a simplified structure. Therefore, the cost is reduced. A grab rail is attached to the rear portion of seat rails supporting a seat. The grab rail is provided with left mount holes and right mount holes serving as a mount portion used to attach the grab rail to the seat rails. A muffler support for supporting the muffler of an exhaust system is also provided. The grab rail also serves as the muffler support.

20 Claims, 6 Drawing Sheets

GRAB RAIL AND MUFFLER SUPPORT STRUCTURE

CROSS-REFERENCE TO RELATED APPLICATIONS

This nonprovisional application claims priority under 35 U.S.C. § 119(a) on Patent Application No. 2004-283490, filed in Japan on Sep. 29, 2004, the entirety of which is incorporated herein by reference.

BACKGROUND OF THE INVENTION

1. Field of the Invention:

The present invention relates to improvement of a grab rail and a muffler support structure.

2. Description of Background Art:

A conventional grab rail that is attached to a seat rail is known in the background art (for example, refer to Japanese Patent Laid-open No. Hei 10-236358).

The present applicant has proposed a prior art muffler support structure in which a seat frame or the like is provided with a bracket to which a muffler is attached (for example, refer to Japanese Utility Model Publication No. Hei 6-2876).

Japanese Patent Laid-open No. Hei 10-236358 is described below. The reference numerals described in the document are used herein.

FIG. 6 of Japanese Patent Laid-open No. Hei 10-236358 illustrates mount bosses 58 and brackets 59 are attached to the respective rear portions of a pair of left and right seat rails 45, and a rear grab rail 60 is attached to the mount bosses 58 and the brackets 59 with bolts 67, 68.

Japanese Utility Model Publication No. Hei 6-2876 is described below. The reference numerals described in the document are used herein.

FIG. 1 of Japanese Utility Model Publication No. Hei 6-2876 illustrates the following. A seat rail 3 extends backward from an upper portion of a center pipe 2, and brackets 8 and 9 are attached to the front and rear portions, respectively, of the seat rail 3. In addition, a rear frame 4 extends backward and obliquely upward from the lower portion of the center pipe 2, a bracket 10 is attached to the end of the rear frame 4, and an exhaust muffler 5 is mounted to these brackets 8, 9 and 10.

In Japanese Patent Laid-open No. Hei 10-236358, the rear grab rail 60 is a component used for grabbing a vehicle body. If this component serves another function, however, an attachment member that is used to attach a component achieving the function, to the seat rail 45 can be eliminated, which suppresses an increase in the number of components.

In Japanese Utility Model Publication No. Hei 6-2876, the exhaust muffler 5 is mounted to the brackets 8, 9 attached to the seat rail 3 and to the bracket 10 attached to the rear frame 4. However, if the exhaust muffler 5 can be mounted more simply, that is, it can be mounted by use of the existing component for instance, it is unnecessary to provide the brackets 8, 9 and 10 particularly. This can more simplify the structures of the seat rail 3 and the rear frame 4.

SUMMARY OF THE INVENTION

It is an object of the present invention to improve a grab rail and a muffler support structure so as to reduce the number of components and simplify the structure, thereby reducing cost.

In a grab rail attached to a rear portion of a seat rail supporting a seat, according to a first aspect of the present invention, the grab rail includes a mount portion used to attach the grab rail to the seat rail; and a muffler support for supporting a muffler of an exhaust system.

The grab rail includes the mount portion used to attach the grab rail to the seat rail and the muffler support for supporting the muffler of the exhaust system. In other words, the grab rail also serves as the muffler support. Accordingly, the seat rail is provided with only a grab rail mount portion adapted to attach the grab rail thereto, which eliminates an additional muffler support. In addition, since an operator grabs the grab rail in order to handle a vehicle body, the mount portion of the grab rail is often increased in strength. Thus, the muffler can be supported with a high degree of strength.

According to a second aspect of the present invention, the mount portion and the muffler support are together formed at a plate-like bracket provided at the grab rail. For example, the number of components can be more reduced when a mount portion and a muffler support are together formed at a single plate-like bracket than when the mount portion and the muffler support are provided at different brackets, respectively.

If the mount portion and the muffler support are together formed at the plate-like bracket in such a manner as to be brought into proximity to each other, when an external force is exerted on the muffler support, moment occurring in the mount portion can be more reduced.

According to a third aspect of the present invention, the muffler support is configured as a mount hole formed in the plate-like bracket, or as a hole portion of a cylindrical portion provided at the plate-like bracket.

The muffler support is configured as the mount hole formed in the plate-like bracket, or as the hole portion of the cylindrical portion provided at the plate-like bracket. The muffler is supported by using the mount hole or the hole portion of the cylindrical portion.

According to a fourth aspect of the present invention, the grab rail has a light stay used to attach a rear light unit thereto and a tool box is attached to the light stay.

Since the light stay is provided at the grab rail, the number of components can reduced compared with a case where a member used to attach the light stay to the seat rail is additionally provided. In addition, since the tool box is attached to the light stay, the number of components can be reduced compared with a case where a member used to attach the tool box to the seat rail or the grab rail is additionally provided.

According to a fifth aspect of the present invention, the light stay is formed in an inverse trapezoid and the rear light unit is placed inside the profile of the inverse-trapezoidal light stay as viewed from the rear of a vehicle.

Since the rear light unit is placed inside the profile of the light stay, the rear light unit can be protected against a colliding object from the side of the vehicle.

According to a sixth aspect of the present invention, a seat rail for supporting a seat, and a grab rail attached to the seat rail are provided, and the grab rail includes a mount portion used to attach the grab rail to the seat rail, and a muffler support for detachably supporting a muffler of an exhaust system.

Since the muffler support is provided at the grab rail so as to support the muffler, a member used exclusively to support the muffler can be eliminated. In addition, it is unnecessary to form the muffler support at the seat rail, which can simplify the shape of the seat rail and reduce the weight of the seat rail.

According to the first aspect of the present invention, since the grab rail is provided with a mount portion used to attach the grab rail to the seat rail and a muffler support for supporting the muffler of an exhaust system, the grab rail also serves as the muffler support. Thus, the number of components can be reduced compared with a case where a muffler support is additionally provided at the seat rail.

Accordingly, the seat rail needs only to be provided with a grab rail mount portion used to attach the grab rail to the seat rail, that is, it is unnecessary to provide an additional muffler support at the seat rail, simplifying the seat rail. The reduction in the number of components used to support the muffler and the simplification of the seat rail described above can reduce cost.

According to the second aspect of the present invention, the mount portion used to attach the grab rail to the seat rail and the muffler support are together formed at the plate-like bracket; therefore, the number of components can be more reduced when a mount portion and a muffler support are together formed at a single plate-like bracket than when the mount portion and the muffler support are provided at different brackets, respectively. Thus, cost can be reduced.

In addition, the mount portion and the muffler support are together formed at the plate-like bracket in such a manner as to be brought into proximity to each other. Therefore, when an external force is exerted on the muffler support, moment occurring in the mount portion can be more reduced, which is advantageous to prevention of deformation of the plate-like bracket. Furthermore, since the bracket is plate-like, it is easy to form the mount portion and the muffler support, thereby reducing manufacturing cost.

According to the third aspect of the present invention, since the muffler support is configured as a mount hole formed in the plate-like bracket, or as a hole portion of a cylindrical portion provided at the plate-like bracket, the muffler can be easily supported by using the mount hole or the hole portion of the cylindrical portion.

According to the fourth aspect of the present invention, since the grab rail is provided with the light stay and the tool box is attached to the light stay, the number of components can be reduced compared with a case where a member used to attach the light stay thereto or a member used to attach the tool box thereto is provided additionally, thereby reducing cost.

According to the fifth aspect of the present invention, the light stay is formed in an inverse trapezoid and the rear light unit is placed inside the profile of the inverse-trapezoidal light stay as viewed from the rear of a vehicle. Therefore, the light stay can protect the rear light unit, e.g., its lens against a colliding object from the side of the vehicle.

According to the sixth aspect of the present invention, the grab rail is provided with the mount portion used to attach the grab rail to the seat rail and the muffler support for detachably supporting the muffler of the exhaust system. That is to say, the muffler is supported by the muffler support provided at the garb rail. Therefore, a member used exclusively to support the muffler can be eliminated, which can reduce the number of components, thereby reducing cost. In addition, it is unnecessary to form the muffler support at the seat rail, which can simplify the shape of the seat rail and reduce the manufacturing cost of the seat rail.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will be below described with reference to the accompanying drawings. Incidentally, the drawings should be viewed according to the orientation of the reference numerals.

Figure 1:
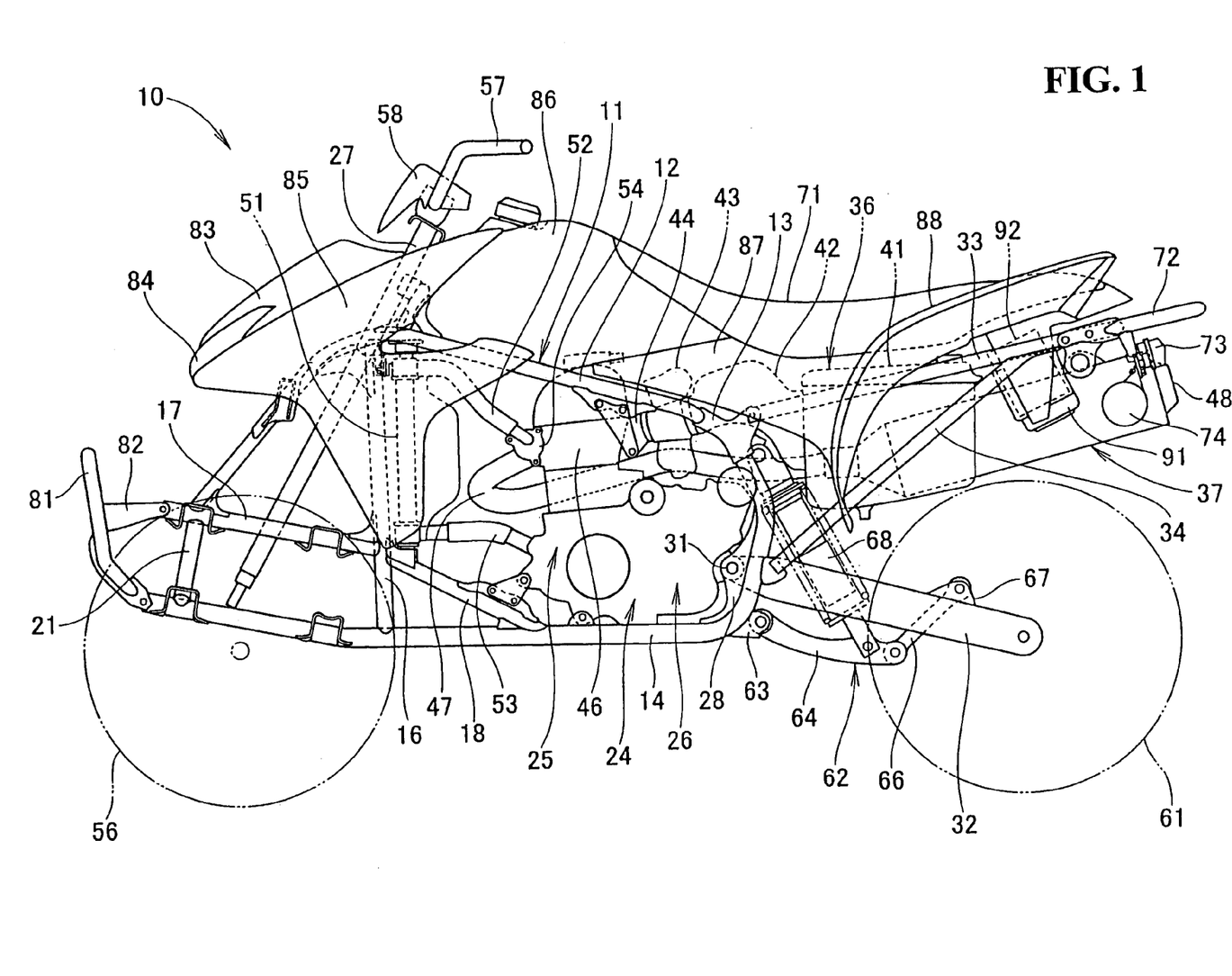
FIG. 1 is a side view of a buggy type vehicle provided with a grab rail and a muffler support structure according to the present invention.

FIG. 1 is a side view of a buggy type vehicle having a grab rail and a muffler support structure. A buggy type vehicle 10 is a waste land traveling vehicle having a body frame 11. This body frame 11 includes a pair of left and right main pipes 12 (hereinafter, a front side one of a pair of left and right components is to be denoted with a reference numeral), a pair of left and right lower pipe 14, a pair of left and right down pipe 16, a pair of left and right front reinforcing pipe 17, a pair of left and right rear reinforcing pipe 18, a pair of left and right front connection pipe 21, and a plurality of cross pipes (not shown) connecting the above-noted left and right members. The main pipes 12 are each formed to descend to its middle portion and ascend therefrom as viewed laterally. The lower pipes 14 are each coupled to the main pipe 12 by way of a coupling member 13. Each of the down pipes 16 is virtually vertically spanned between the main pipe 12 and the lower pipe 14. The front reinforcing pipes 17 are each attached to the front end of the main pipe 12 and the down pipe 16. Each of the rear reinforcing pipes 18 is obliquely spanned between down pipe 16 and the lower pipe 14. The front connection pipes 21 are each spanned between the front reinforcing pipe 17 and the front portion of the lower pipe 14.

In addition, the buggy type vehicle 10 is configured as below. The main pipes 12, lower pipes 14 and rear reinforcing pipes 18 carry a power unit 24 (including an engine 25 and a transmission 26 provided integrally with the rear portion of the engine 25). The main pipes 12 and lower pipes 14 pivotally carry a steering shaft 27. A pair of left and right pivot plates 28 is attached to the corresponding rear parts of the main pipes 12. Swing arms 32 are vertically swingably attached to the pivot plates 28 via pivot shafts 31, respectively. A pair of left and right seat rails 33 extends each backward and obliquely upward from the coupling member 13. A rear slant pipe 34 is spanned between the seat rail 33 and the lower pipe 14.

The engine 25 has a rear portion to which an intake device 36 is connected and a front portion to which an exhaust device 37 is connected. The intake device 36 includes an air cleaner 41, a connecting tube 42, a carburetor 43 and an air intake pipe 44, which are disposed in this order. The air intake pipe 44 is connected to the rear portion of the cylinder head 46 of the engine 25. The exhaust device 37 is configured such that an exhaust pipe 47 is connected to the front portion of the cylinder head 46 and a muffler 48 is connected to the rear end of the exhaust pipe 47. Reference numeral 51 denotes a radiator, which is mounted to the body frame 11 in such a manner as to be almost-vertical, along the down pipe 16. Hoses 52 and 53 adapted to circulate cooling water extend from the upper portion and lower portion, respectively, of the radiator 51 from the engine 25. Incidentally, reference numeral 54 denotes a water pump located near the engine 25.

The steering shaft 27 is a member used to steer left and right front wheels 56 and has an upper end to which a handlebar 57 is attached. Reference numeral 58 denotes a handle cover.

The swing arms 32 are members, which have rear ends to which left and right rear wheels 61 are mounted, respectively, through an axle. In addition, the swing arms 32 are each connected to the rear lower portion of the lower pipe 14 through a link device 62.

The link device 62 is configured as below. A first link 64 is swingably attached to a link attachment portion 63 attached to the lower pipe 14. A second link 66 is swingably attached to the first link 64. The second link 66 is at its end connected to a link attachment portion 67 attached to the swing arm 32.

A rear cushion unit 68 has one end to which the first link 64 is connected and the other end to which the coupling member 13 is connected. The seat rails 33 are members on which a seat 71 is mounted and which have rear ends to which a grab rail 72 is attached. The grab rail 72 is a member that supports the muffler 48, a rear light unit 73 and a tool box 74.

Reference numeral 81 denotes a front bumper, 82 a bumper support member, 83 a front cover, 84 a headlamp, 85 a front fender, 86 a fuel tank, 87 a side cover, 88 a rear fender, 91 a storage unit molded integrally with the rear fender 88, and 92 a battery placed in the storage unit 91.

Figure 2:
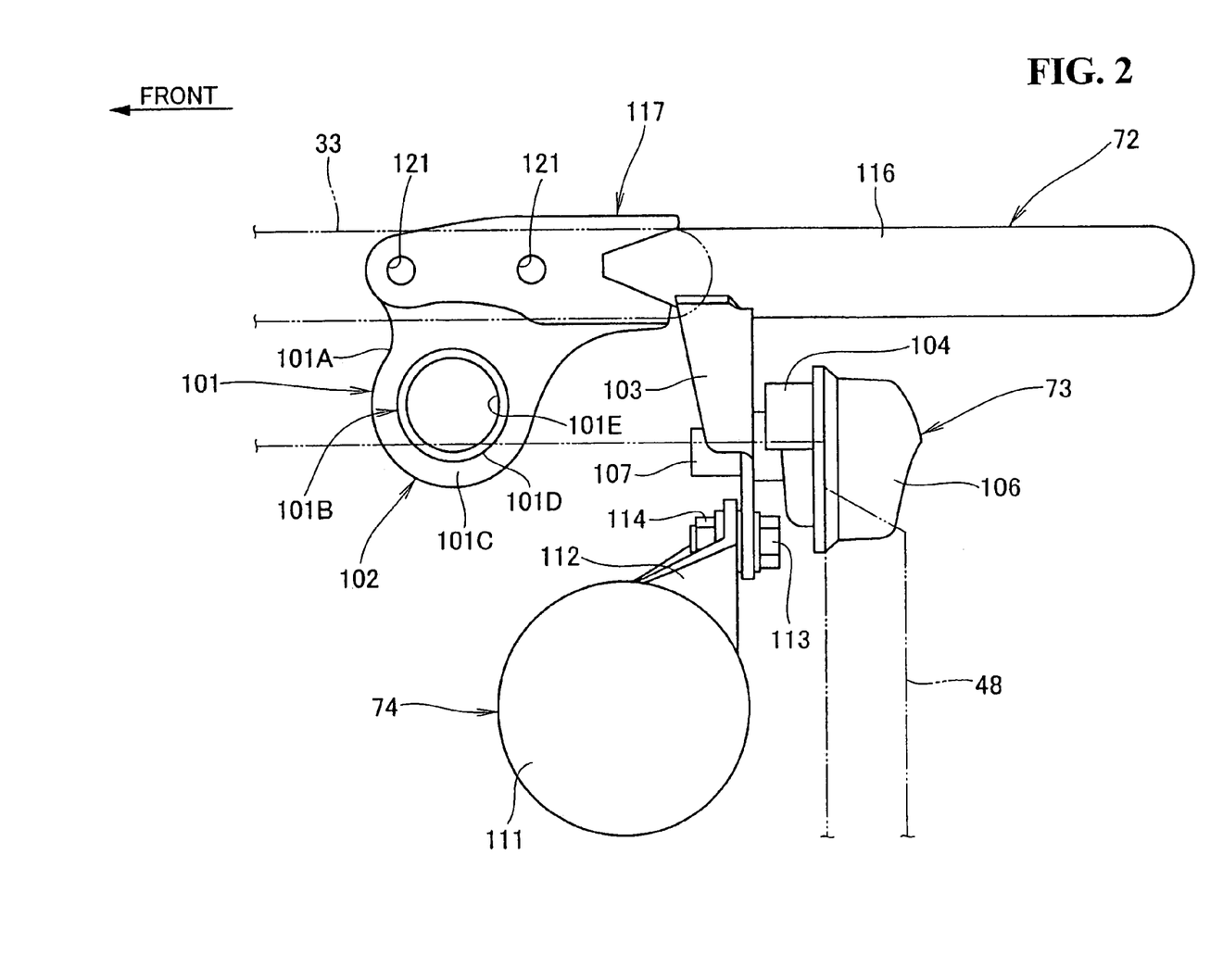
FIG. 2 is a side view of the grab rail and its periphery according to the present invention.

FIG. 2 is a side view of the grab rail and its periphery according to the present invention. Arrow (FRONT) in the figure denotes the front of the vehicle (the same holds for the following figures).

The grab rail 72 is provided with a right-hand bracket 101 to be attached to the seat rail 33. The right-hand bracket 101 is provided with a muffler support 102 for supporting the muffler 48. In addition, the grab rail 72 is provided at its lower portion with a light stay 103 used to support the rear light unit 73 and the tool box 74.

The rear light unit 73 includes a housing 104 supporting an electric bulb and a lens 106 shielding the front of the housing 104. The rear light unit 73 is attached to the light stay 103 with a fastening member 107.

The tool box 74 made of resin includes a cylindrical tool box body 111 and a body support 112 molded integrally with the tool box body 111. The tool box body 111 is attached to the light stay 103 by means of a bolt 113 and a nut 114.

Figure 3:
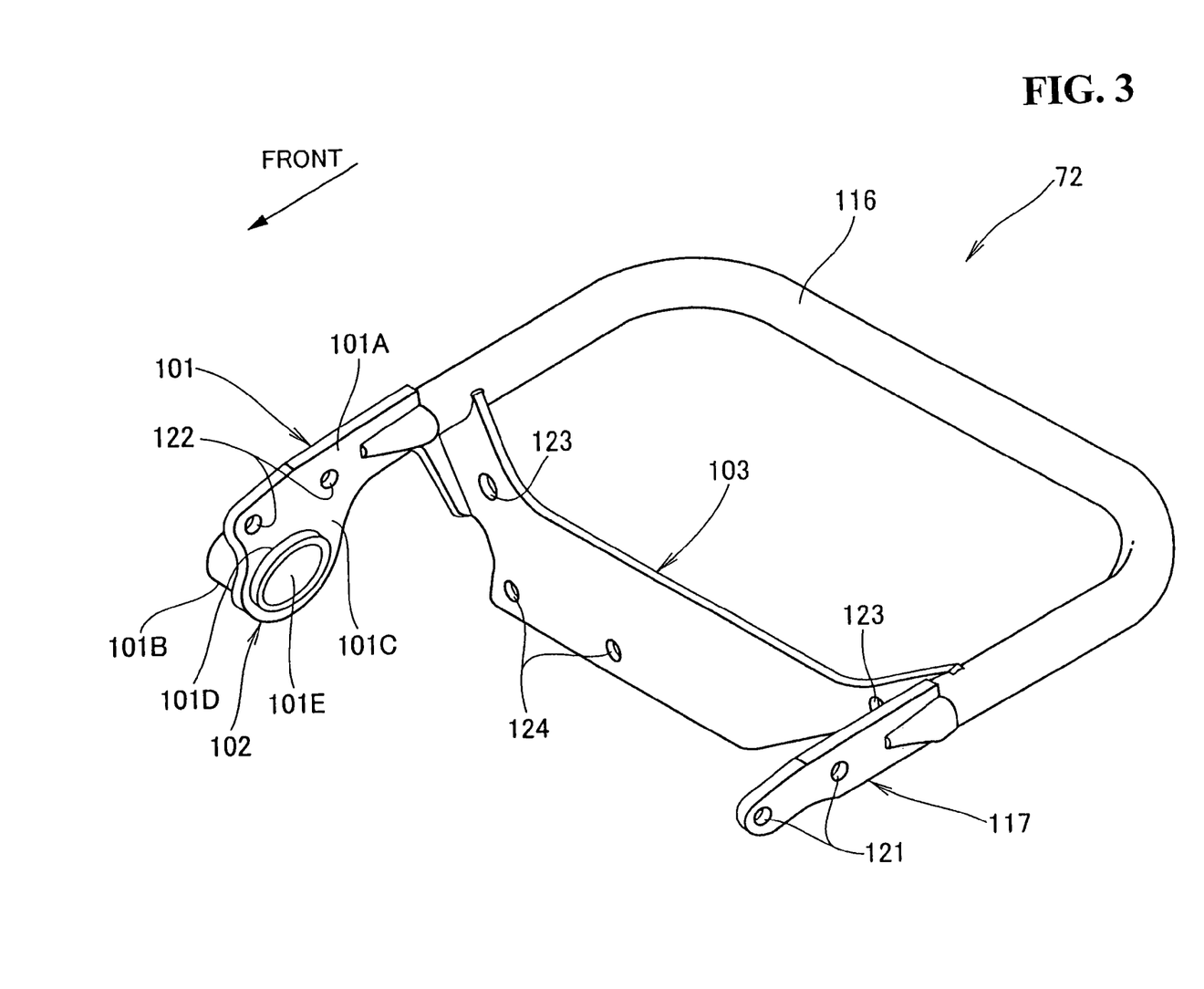
FIG. 3 is a perspective view of the grab rail according to the present invention.

FIG. 3 is a perspective view of the grab rail according to the present invention. The grab rail 72 is composed of a main body 116 made of a U-shaped pipe, a left-hand bracket 117 and the above-mentioned right-hand bracket 101 attached respectively to the ends of the main body 116. The light stay 103 is spanned between the ends of the main body 116.

The left-hand bracket 117 is a plate-like member formed with left mount holes 121, 121 adapted to attach the left-hand bracket 117 to the rear end of the corresponding seat rail 33 (see FIG. 1).

The right-hand bracket 101 is composed of a plate portion 101A as a plate-like member and a cylindrical portion 101B attached to a downward protruding portion 101C formed at the lower portion of the plate portion 101A. The plate portion 101A is formed with right mount holes 122, 122 adapted to attach the right-hand bracket 101 to the rear end of the corresponding seat rail 33.

The muffler support 102 has a cylindrical portion 101B fixedly fitted into a mount hole 101D bored in the downward protruding portion 101C. Specifically, a through hole 101E is a hole portion of the cylindrical portion 101B. The muffler support 102 supports the muffler 48 (see FIG. 1) by allowing a bolt described later to pass through the through hole 101E.

The light stay 103 is a plate-like member and is formed with light mount holes 123, 123 adapted to attach the rear light unit 73 (see FIG. 2) thereto and box mount holes 124, 124 adapted to attach the tool box 74 (see FIG. 2) thereto.

Incidentally, the muffler support 102 is not limited to the above configuration. Specifically, the muffler support 102 does not have to be provided with the cylindrical portion 101B at the plate-like bracket 101, but may be provided with only the mount hole 101E bored in the plate-like bracket 101.

Figure 4:
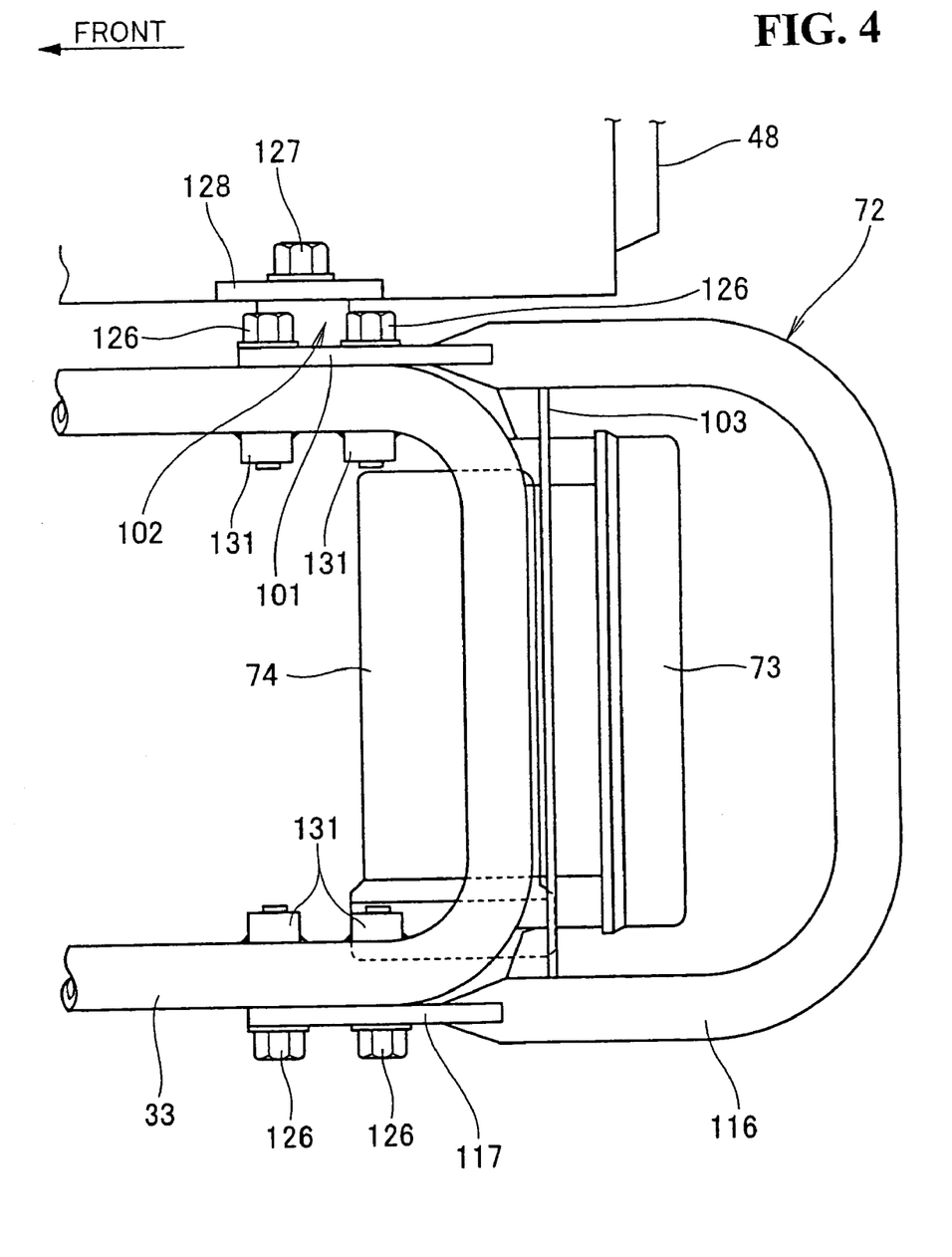
FIG. 4 is a plan view of the grab rail and its periphery according to the present invention.

FIG. 4 is a plan view of the grab rail and its periphery according to the present invention. In the figure, the left-hand bracket 117 and right-hand bracket 101 of the grab rail 72 are attached to the left and right rear ends of the seat rails 33, respectively, by means of a plurality of bolts 126. The rear ends of the seat rails 33 are a portion formed in a U-shape as viewed from above. The support stay 128 on the side of the muffler 48 is attached to the muffler support 102 of the right-hand bracket 101. More specifically, while the support stay 128 is brought into contact with the end face of the cylindrical portion 101B, a bolt 127 is inserted through the hole (not shown) of the support stay 128 and the through hole 101E (see FIG. 3) of the cylindrical portion 101B and then a nut (not shown) is fastened to the end of the bolt 27. Thus, the rear light unit 73 and the tool box 74 are attached to the light stay 103. Incidentally, reference numeral 131 denotes nuts that are attached to the seat rails 33 and are to be fastened to the bolts 126.

Figure 5:
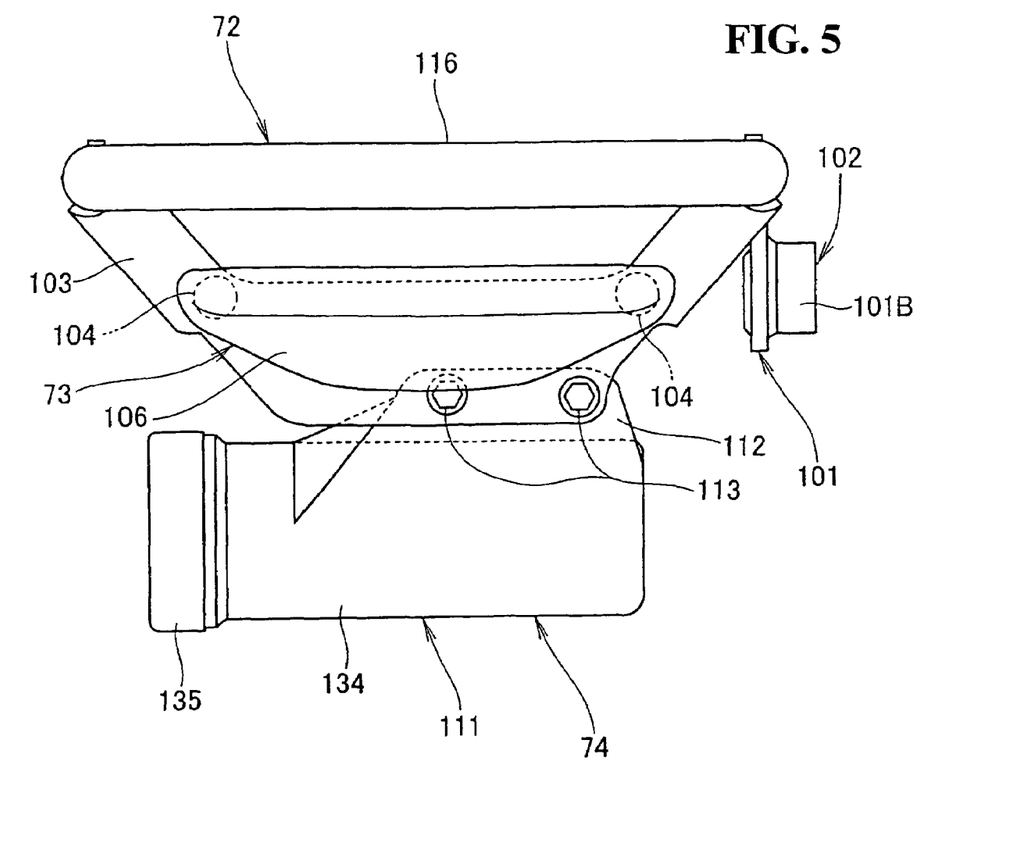
FIG. 5 is a rear view of the grab rail and its periphery according to the present invention.

FIG. 5 is a back view of the grab rail and its periphery according to the present invention. The rear light unit 73 is configured such that the lens 106 is formed in an inverse trapezoid almost-similar to the shape of the light stay 103 as viewed from back. In addition, the rear light unit 73 is placed within the inverse trapezoidal profile of the light stay 103.

In this way, since the rear light unit 73 is formed in an inverse trapezoid, design harmonized with the light stay 103 can be provided. In addition, since the rear light unit 73 is not laterally project from the light stay 103, the light stay 103 can protect the rear light unit 73, particularly the lens 106.

The tool box body 111 of the tool box 74 includes a tool storage section 134 formed in a bottomed cylindrical shape with an opening at its one end and a bottom at the other end, and a cap 135 closing the opening of the tool storage section 134.

Figure 6A:
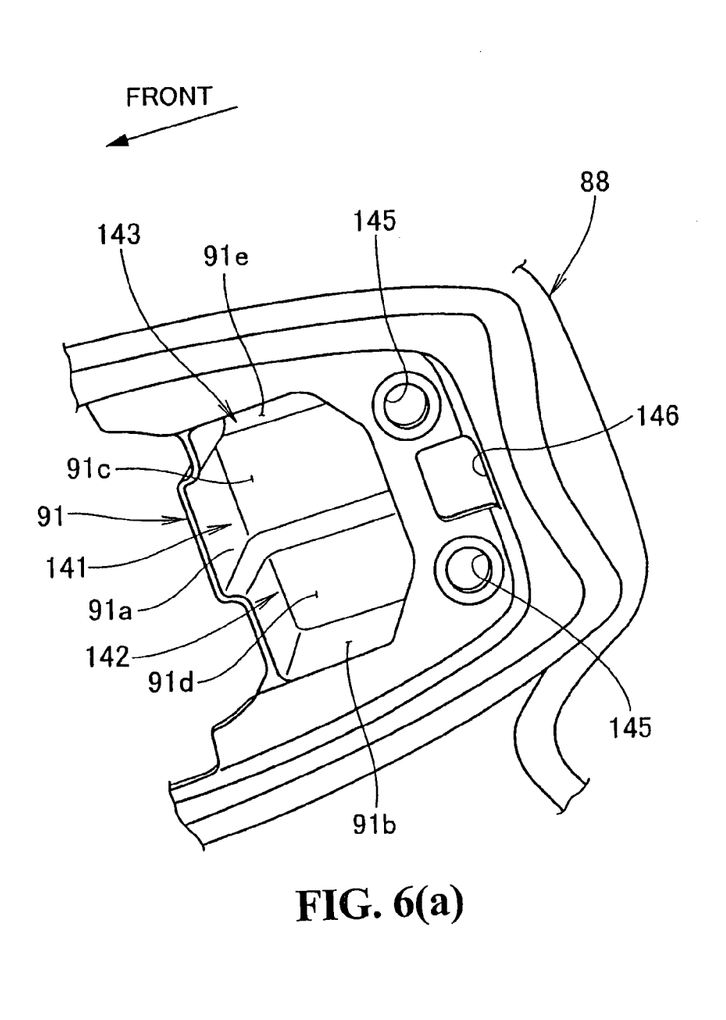
FIGS. 6(a) and 6(b) are a perspective views of the storage section of a rear fender according to the present invention.
Figure 6B:
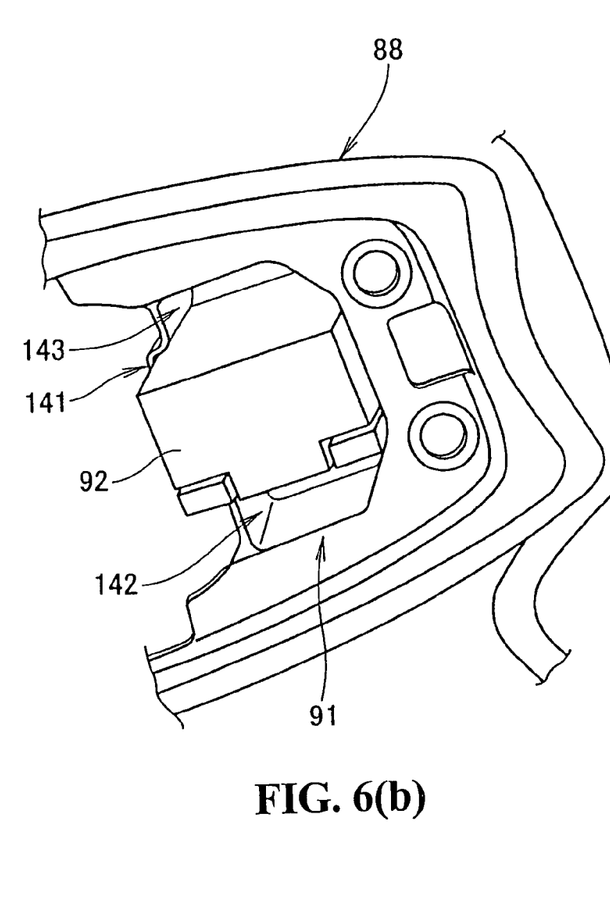

FIGS. 6(a) and 6(b) are perspective views illustrating the storage unit of the rear fender according to the present invention. In FIG. 6(a), the storage unit 91 is formed integrally with the rear fender 88 at its middle portion and has side faces 91a, 91b (the other two side faces are not shown) on the respective four sides thereof and bottom surfaces 91c, 91d and 91e. In addition, the storage unit 91 has a first storage section 141 placed in the middle thereof, and a second storage section 142 and a third storage section 143 placed on the left side and right side, respectively, of the first storage section 141.

The bottom surface 91c of the first storage section 141 is formed at a level lower by one step than the bottom surface 91d of the second storage section 142 and the bottom surface 91e of the third storage section 143.

The storage section 91 is covered from above with the openable seat 71 (see FIG. 1). Reference numerals 145, 145 denote mount portions to which elastic members are attached and which receive the seat 71, and 146 denotes an opening for provision of a seat lock device (not shown) thereat.

In FIG. 6(b), the battery 92 is stored in the first storage section 141 shown in FIG. 6(a). In this state, the battery 92 separates the second storage section 142 from the third storage section 143, in both of which small objects, fuses and the like can be stored. The storage section 91 is enclosed by the U-shaped rear end of the seat rails 33 shown in FIG. 4 and the battery is stored in a U-shaped portion (most projecting portion) most projecting rearward of the vehicle.

As described above with reference to FIGS. 2 and 3, the grab rail 72 is attached to the rear portion of the seat rails 33 supporting the seat 71 (see FIG. 1). According to the first aspect of the present invention, the grab rail 72 is provided with the left mount holes 121 and the right mount holes 122 serving as a mount portion used to attach the grab rail 72 to the seat rails 33, and the muffler support 102 for supporting the exhaust system muffler 48.

The grab rail 72 is provided with the left mount holes 121 and the right mount holes 122 used to attach the grab rail 72 to the seat rails 33, and the muffler support 102 for supporting the exhaust system muffler 48. Therefore, the grab rail 72 also serves as the muffler support 102, which reduces the number of components as compared with a case where a muffler support is additionally provided at the seat rails 33.

Accordingly, the seat rails 33 needs only to have a grab rail mount portion used to attach the grab rail 72 thereto. Specifically, it is unnecessary to additionally provide a muffler support, simplifying the seat rails 33. The reduction in the number of components used to support the muffler 48 and the simplification of the seat rails stated above can reduce cost.

According to the second aspect of the present invention, the right mount holes 122 and the muffler support 102 are together formed in and at the right-hand bracket 101 as a plate-like bracket provided at the grab rail 72.

The right mount holes 122 serving as a mount portion used to attach the grab rail to the seat rail 33 and the muffler support 102 are together formed in and at the right-hand bracket 101. Therefore, the number of components can be more reduced to thereby reduce cost when the right mount hole 122 and the muffler support 102 are together formed in and at the right-hand bracket 101 than when a mount portion and a muffler support are formed at different members.

In addition, the right mount holes 122 and the muffler support 102 are together formed in and at the right-hand bracket 101 in such a manner as to be brought into proximity to each other. Therefore, when an external force is exerted on the muffler support 102, moment occurring in the right mount holes 122 can be more reduced, which is advantageous to prevention of deformation of the right-hand bracket 101 and the like.

Further, since the right-hand bracket 101 is plate-like, it is easy to form the right mount holes 122 and the muffler support 102, reducing manufacturing cost.

According to the third aspect of the present invention, the muffler support 102 is configured as the mount hole 101D formed in the right-hand bracket 101, or as the through hole 101E, i.e., a hole portion of the cylindrical portion 10B provided in the right-hand bracket 101.

The muffler support 102 is configured as the mount hole 101D formed in the right-hand bracket 101, or as the through hole 101E of the cylindrical portion 101B provided in the right-hand bracket 101. Therefore, the muffler 48 can be easily support by use of the mount hole 101D, or the through hole 101E of the cylindrical portion 101B.

According to the fourth aspect of the present invention, the light stay 103 is provided at the grab rail 72 so as to attach the rear light unit 73 thereto and is used to attach the tool box 74 thereto.

Since the grab rail 72 is provided with the light stay 103, which is used to attach the tool box 74 thereto, the number of components can be reduced compared with a case where for instance a member used to attach a light stay thereto or a member used to attach a tool box thereto is provided additionally. Thus, cost can be reduced.

According to the fifth aspect of the present invention, the light stay 103 is formed in an inverse trapezoid so that the rear light unit 73 may be placed inside the profile of the inverse-trapezoidal light stay 103 as viewed from the rear of the vehicle.

The light stay 103 is formed in an inverse trapezoid so that the rear light unit 73 may be placed inside the profile of the inverse-trapezoidal light stay 103 as viewed from the rear of the vehicle. Therefore, the light stay 103 can protect the rear light unit 73, e.g., its lens 106 against a colliding object from the side of the vehicle.

According to the sixth aspect of the present invention, the seat rails 33 supporting the seat 71 and the grab rail 72 attached to the seat rails 33 are provided, and the grab rail 72 is formed with the left mount holes 121 and the right mount holes 122 used to attach the grab rail 72 to the seat rails 33, and the muffler support 102 supporting detachably the muffler 48 of the exhaust system.

The grab rail 72 is formed with the left mount holes 121 and the right mount holes 122 used to attach the grab rail 72 to the seat rails 33, and the muffler support 102 supporting detachably the muffler 48 of the exhaust system. Therefore, supporting the muffler 48 by use of the muffler support 102 provided at the grab rail 72 eliminates a member used exclusively to support the muffler 48, which reduces the number of components, reducing cost.

In addition, it is not needed to form a muffler support at the seat rails 33, which forms the seat rails into a simple shape, suppressing the manufacturing cost of the seat rails 33.

Incidentally, while the muffler support is formed at the plate-like bracket in the present invention, the invention is not limited to this configuration. The muffler support may be formed at the light stay.

In addition, while in the present embodiment the grab rail 72 is provided at the rear ends of the seat rails 33 as shown in FIG. 4, the present invention is not limited to this configuration. The grab rail may be provided at the side portions of the seat rails. In this case, a stay used to attach a reflector to the grab rail may be provided in place of the light stay 103.

The grab rail and muffler support structure of the present invention are suitable to the buggy type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A grab rail attachable to a rear portion of a seat rail that supports a seat, said grab rail comprising:
   a mount portion used to attach the grab rail to the seat rail; and
   a muffler support for supporting a muffler of an exhaust system.

2. The grab rail according to claim 1, wherein the mount portion and the muffler support are together formed at a plate-like bracket provided at the grab rail.

3. The grab rail according to claim 2, wherein the muffler support is configured as a mount hole formed in the plate-like bracket, or as a hole portion of a cylindrical portion provided at the plate-like bracket.

4. The grab rail according to claim 3, further comprising:
   a light stay used to attach a rear light unit thereto,
   wherein a tool box is attachable to the light stay.

5. The grab rail according to claim 4, wherein the light stay is formed in the shape of an inverse trapezoid, and the rear light unit is placed inside the profile of the inverse-trapezoidal light stay as viewed from the rear of a vehicle.

6. The grab rail according to claim 1, further comprising a generally U-shaped main body, the mount portion including a right-hand bracket and a left-hand bracket, each of the right-hand and left-hand brackets being mounted to left and right ends of the U-shaped main body, respectively.

7. The grab rail according to claim 6, further comprising a light stay, said light stay extending between the left and right ends of the U-shaped main body at a location adjacent to the right-hand and left-hand brackets, said light stay being used to support a rear light unit.

8. A muffler support structure comprising:
   a seat rail for supporting a seat; and
   a grab rail attached to the seat rail;
   wherein the grab rail includes a mount portion used to attach the grab rail to the seat rail, and a muffler support for supporting a muffler of an exhaust system.

9. The muffler support structure according to claim 8, wherein the mount portion and the muffler support are together formed at a plate-like bracket provided at the grab rail.

10. The muffler support structure according to claim 9, wherein the muffler support is configured as a mount hole formed in the plate-like bracket, or as a hole portion of a cylindrical portion provided at the plate-like bracket.

11. The muffler support structure according to claim 10, wherein the grab rail further comprises a light stay used to attach a rear light unit thereto, wherein a tool box is attachable to the light stay.

12. The muffler support structure according to claim 11, wherein the light stay is formed in the shape of an inverse trapezoid, and the rear light unit is placed inside the profile of the inverse-trapezoidal light stay as viewed from the rear of a vehicle.

13. The muffler support structure according to claim 8, further comprising a generally U-shaped main body, the mount portion including a right-hand bracket and a left-hand bracket, each of the right-hand and left-hand brackets being mounted to left and right ends of the U-shaped main body, respectively.

14. The muffler support structure according to claim 13, further comprising a light stay, said light stay extending between the left and right ends of the U-shaped main body at a location adjacent to the right-hand and left-hand brackets, said light stay being used to support a rear light unit.

15. A vehicle comprising:
   a body frame, said body frame including a pair of left and right main pipes, a pair of left and right lower pipes, a pair of left and right front reinforcing pipes, a pair of left and right rear reinforcing pipes, and a pair of left and right front connection pipes;
   a power unit, said power unit being supported by the body frame and including an enging and a transmission;
   a plurality of wheels supported by the body frame; and
   a muffler support structure, said muffler support structure comprising:
      a seat rail for supporting a seat; and
      a grab rail attached to the seat rail;
      wherein the grab rail includes a mount portion used to attach the grab rail to the seat rail, and a muffler support for supporting a muffler of an exhaust system.

16. The vehicle according to claim 15, wherein the mount portion and the muffler support are together formed at a plate-like bracket provided at the grab rail.

17. The vehicle according to claim 16, wherein the muffler support is configured as a mount hole formed in the plate-like bracket, or as a hole portion of a cylindrical portion provided at the plate-like bracket.

18. The vehicle according to claim 17, wherein the grab rail further comprises a light stay used to attach a rear light unit thereto, wherein a tool box is attachable to the light stay.

19. The vehicle according to claim 18, wherein the light stay is formed in the shape of an inverse trapezoid, and the rear light unit is placed inside the profile of the inverse-trapezoidal light stay as viewed from the rear of a vehicle.

20. The vehicle according to claim 15, further comprising a generally U-shaped main body, the mount portion including a right-hand bracket and a left-hand bracket, each of the right-hand and left-hand brackets being mounted to left and right ends of the U-shaped main body, respectively.

* * * * *